US007222865B2

(12) United States Patent
Chen et al.

(10) Patent No.: US 7,222,865 B2
(45) Date of Patent: May 29, 2007

(54) FOLDABLE FRAME ASSEMBLY FOR SUSPENDING A MACHINE ABOVE A GROUND SURFACE

(75) Inventors: Yu-Tien Chen, Taichung (TW); Qing-Yao Cai, Taichung (TW); Ya-Ling Hung, Taichung (TW)

(73) Assignee: P & F Brother Industrial Corporation, Taichung (TW)

( * ) Notice: Subject to any disclaimer, the term of this patent is extended or adjusted under 35 U.S.C. 154(b) by 384 days.

(21) Appl. No.: 11/012,385

(22) Filed: Dec. 14, 2004

(65) Prior Publication Data

US 2006/0075943 A1    Apr. 13, 2006

(30) Foreign Application Priority Data

Oct. 7, 2004    (TW) .............................. 93130343 A

(51) Int. Cl.
*B62B 1/04*    (2006.01)
(52) U.S. Cl. ...................... 280/30; 280/47.24; 280/641; 280/654
(58) Field of Classification Search .................. 280/30, 280/47.131, 47.17, 47.18, 47.2, 47.24, 35, 280/38, 641, 652, 654; 108/133, 129, 130, 108/131, 132
See application file for complete search history.

(56) References Cited

U.S. PATENT DOCUMENTS 5,863,052 A * 1/1999 Roman ......................... 280/30
6,471,220 B1 * 10/2002 Babb ........................... 280/30
6,578,856 B2 * 6/2003 Kahle .......................... 280/30
6,886,836 B1 * 5/2005 Wise ........................... 280/30
6,942,229 B2 * 9/2005 Brazell et al. ................ 280/30
7,059,616 B2 * 6/2006 Wu ......................... 280/47.24
7,077,421 B2 * 7/2006 Wu ............................ 280/645
7,086,434 B2 * 8/2006 Lee ......................... 144/286.1

* cited by examiner

*Primary Examiner*—Christopher P. Ellis
*Assistant Examiner*—Brian Swenson
(74) *Attorney, Agent, or Firm*—Townsend and Townsend and Crew LLP

(57) ABSTRACT

A foldable frame assembly includes a base frame having a wheel-carrying end for mounting a wheel unit, a handgrip end, and an intermediate portion connected to a prop member so as to lift the base frame to a standing position. A tabletop has a front tabletop end pivoted to the intermediate portion for suspending a machine above the ground surface so as to enable a rear tabletop end to turn from a working position to a folded position. A bracing member has an anchoring end pivotally mounted on the wheel-carrying end, and a slidable end coupled with the rear tabletop end such that when the rear tabletop end is turned from the working position to the folded position, the slidable end is turned to be close to the intermediate portion. A rear locking unit is disposed to guard against movement of the slidable end.

8 Claims, 13 Drawing Sheets

FOLDABLE FRAME ASSEMBLY FOR SUSPENDING A MACHINE ABOVE A GROUND SURFACE

BACKGROUND OF THE INVENTION

1. Field of the Invention

This invention relates to a foldable frame assembly for suspending a machine, such as a sawing, cutting or planing machine, above a ground surface, more particularly to a foldable frame assembly which can be folded and unfolded conveniently and which can be adapted for suspending machines of different sizes.

2. Description of the Related Art

Referring to FIG. 1, a conventional foldable frame assembly 10 is shown to include first and second propping frames 11, 12, a pair of wheels 13, a hydraulic cylinder unit 14, and front and rear carrying frames 15, 16. The first and second propping frames 11, 12 are pivotally connected to each other at middle portions thereof. The first propping frame 11 has an upper end formed as a handle 111, a lower end for mounting the wheels 13, and a middle portion formed with first and second positioning holes 112, 113 and two barrier pins 114 adjacent to the first and second positioning holes 112, 113, respectively. The second propping frame 12 has an upper end formed as a transverse rod 121, and a lower end provided with a footpad 122 for resting on the ground surface. The hydraulic cylinder unit 14 is disposed to serve as a damper for folding and unfolding the first and second propping frames 11, 12. The front and rear carrying frames 15, 16 are disposed for supporting a machine 100. The front carrying frame 15 has a lug portion 151 which is mounted securely on the first propping frame 11 by a positioning pin 152 that extends through the lug portion 151 and that engages the first positioning hole 112 so as to lock the first and second propping frames 11, 12 in an unfolded position. The rear carrying frame 16 has a hook portion 161 engaging the transverse rod 121. When it is desired to fold the frame assembly 10 for moving purpose, the user has to hold the machine 100 with one hand and remove the positioning pin 152 from the first positioning hole 112 with the other hand so that the machine 100 can swing downwardly about the transverse rod 121 by virtue of its own weight. At the same time, the user has to fold the first and second propping frames 11, 12 and register the lug portion 151 with the second positioning hole 113 so as to permit insertion of the positioning pin 152 into the second positioning hole 113. However, it is difficult for the user to fold the first and second propping frames 11, 12 because his both hands are already occupied. Moreover, during the folding operation, the frame assembly 10 tends to move undesirably because of the wheels 13, which may result in danger to the user. Furthermore, the conventional frame assembly 10 is only suitable for supporting and carrying machines of a fixed dimension.

SUMMARY OF THE INVENTION

The object of the present invention is to provide a foldable frame assembly which can be folded and unfolded conveniently and safely and which can support machines of different sizes.

According to this invention, the foldable frame assembly includes a base frame having a wheel carrying end and a handgrip end opposite to each other in a longitudinal direction, and an intermediate portion interposed therebetween. A prop member is disposed to be connected to the intermediate portion so as to lift the base frame from a laid-down position to a standing position. A wheel unit is rotatably mounted on the wheel-carrying end about a wheel axis transverse to the longitudinal direction and is disposed to rest on a ground surface. A tabletop is adapted to support a machine thereon, and has front and rear tabletop ends opposite to each other in the longitudinal direction. The front tabletop end is pivotally mounted on the intermediate portion so as to enable the rear tabletop end to turn about a first pivot axis from a working position to a folded position to be close to the intermediate portion. A bracing member has an anchoring end pivotally mounted on the wheel-carrying end about a second pivot axis parallel to the first pivot axis, and a slidable end coupled with the rear tabletop end such that when the rear tabletop end is turned from the working position to the folded position, the slidable end is turned about the second pivot axis to be closer to the intermediate portion. A rear locking unit is disposed to guard against movement of the slidable end relative to the rear tabletop end when the rear tabletop end is in the working position.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
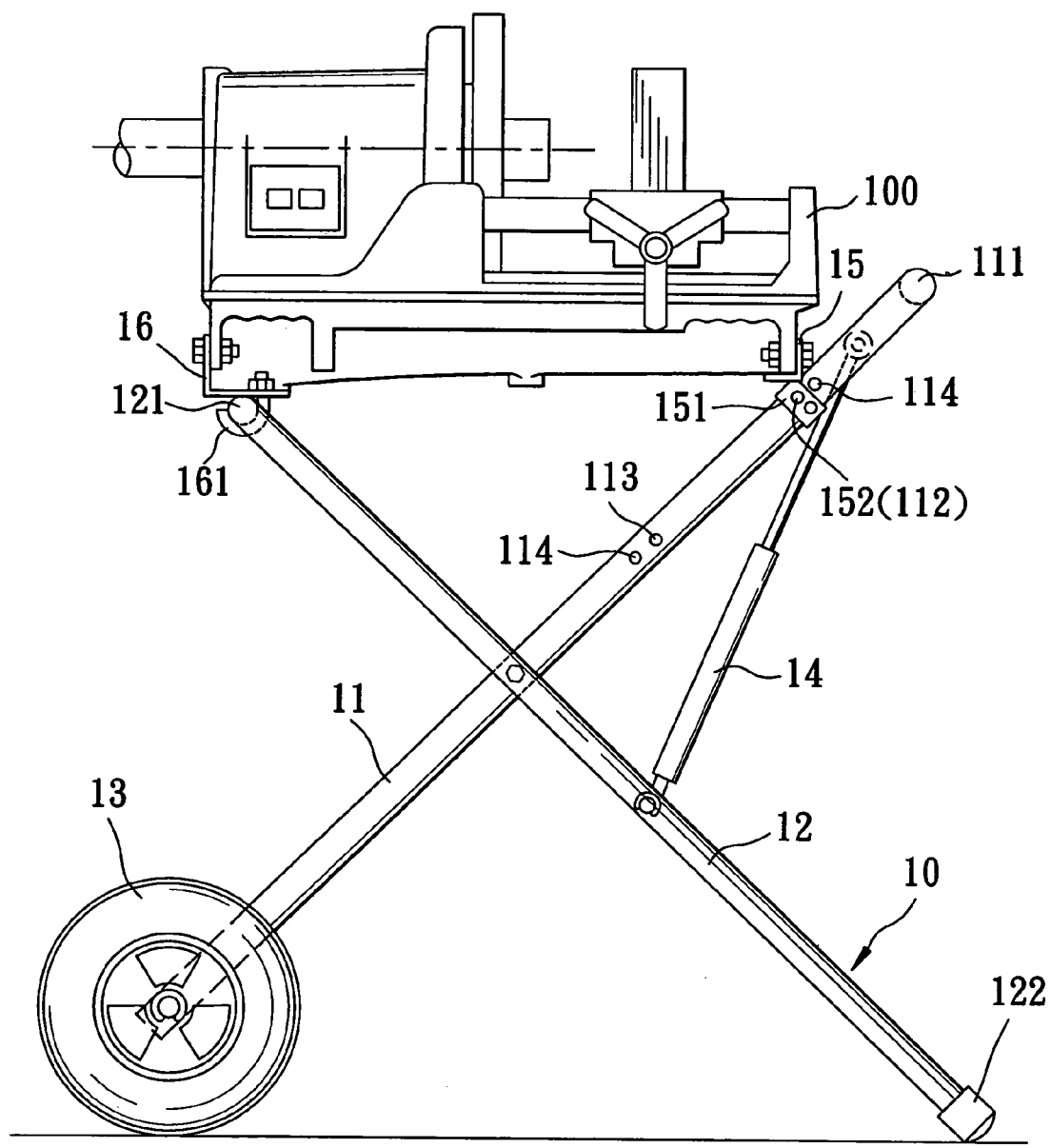
FIG. 1 is a schematic side view of a conventional foldable frame assembly in an unfolded state.
Figure 2:
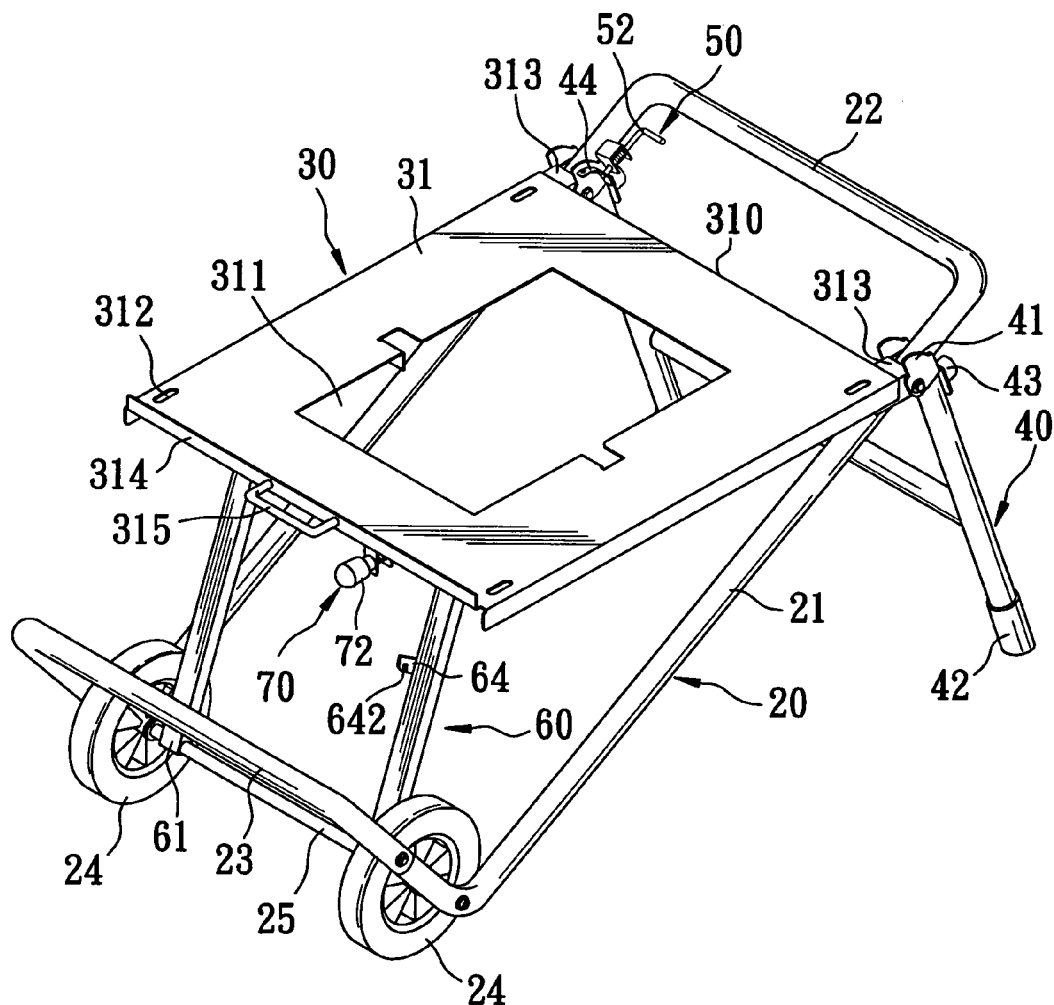
FIG. 2 is a perspective view of a preferred embodiment of a foldable frame assembly according to this invention in an unfolded state.
Figure 3:
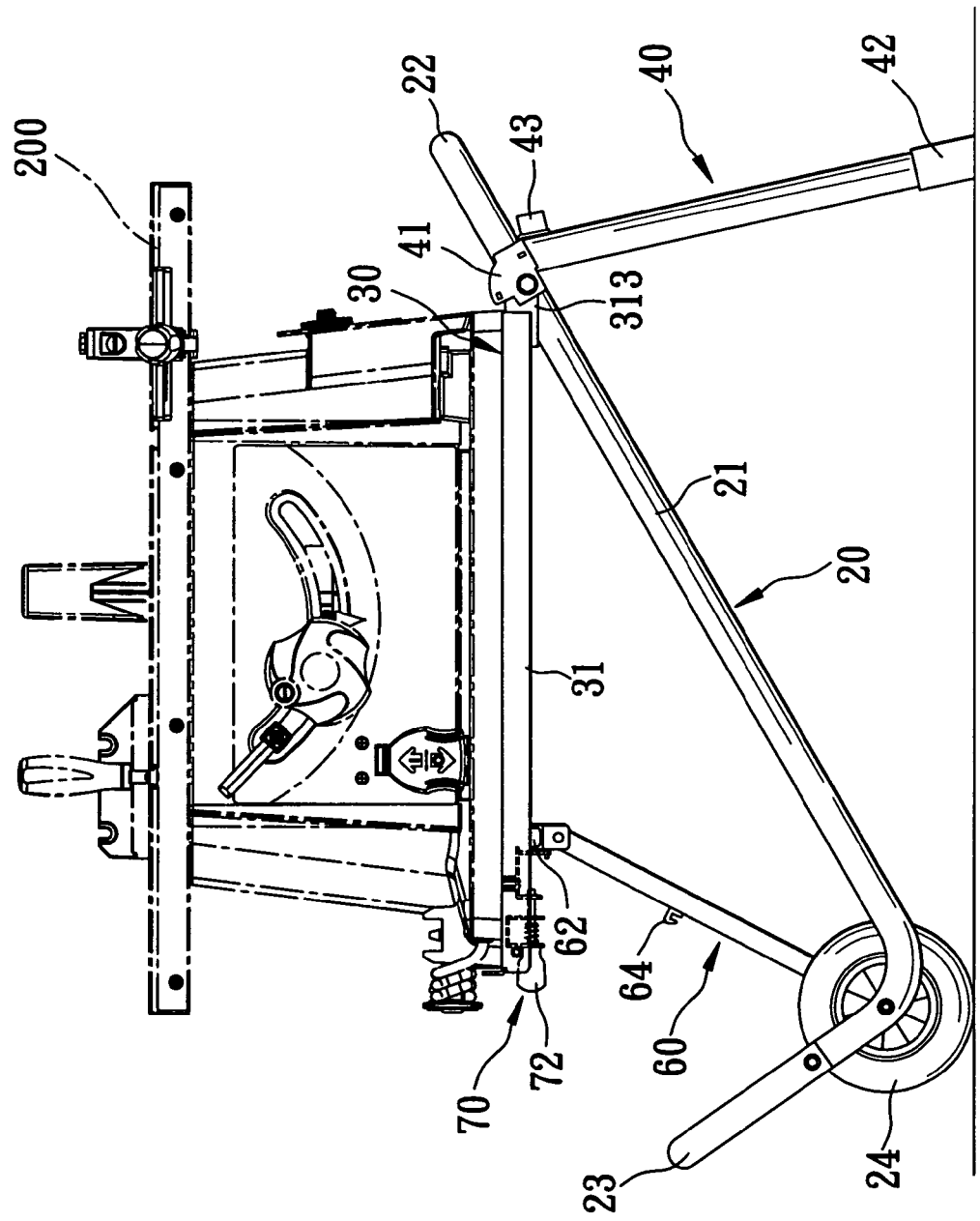
FIG. 3 is a schematic side view of the preferred embodiment in the unfolded state.

Referring to FIGS. 2 and 3, the preferred embodiment of a foldable frame assembly according to the present invention is shown to comprise abase frame 20, a prop member 40, a tabletop unit 30, a front locking unit 50, a bracing member 60, and a rear locking unit 70.

The base frame 20 includes a wheel-carrying end 25 in the form of a wheel axle which extends in a transverse direction and which defines a wheel axis, and a handgrip end 22 in the form of a handgrip shaft which extends in the transverse direction and which is disposed opposite to the wheel-carrying end 25 in a longitudinal direction that is transverse to the transverse direction, and an intermediate portion 21 including two parallel lateral arms which are connected to and which are interposed between the wheel-carrying end 25 and the handgrip end 22. A wheel unit includes two wheels 24 mounted rotatably on the wheel axle and disposed proximate to the lateral arms, respectively, so as to rest on a ground surface.

Figure 8:
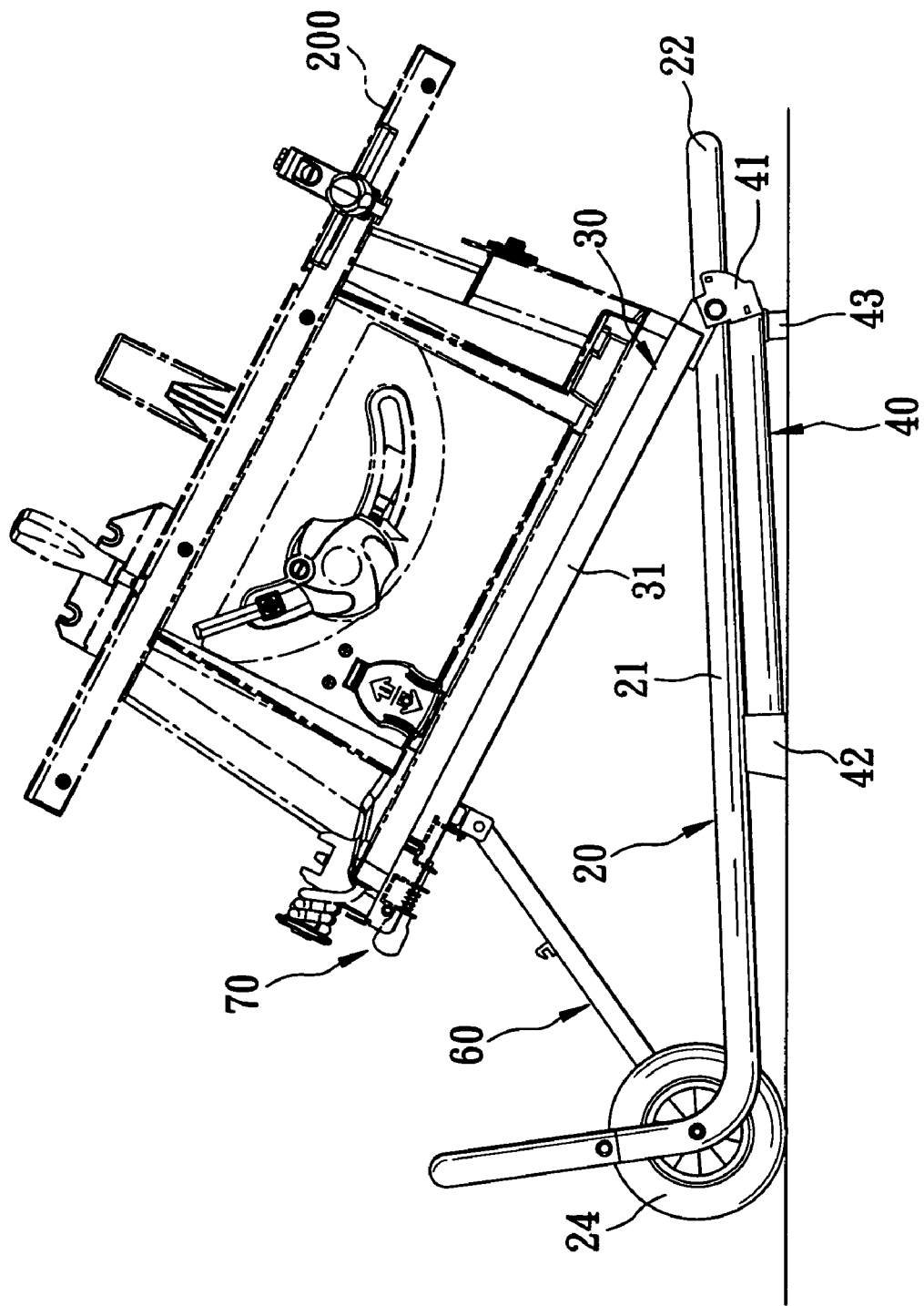
FIG. 8 is a view similar to FIG. 3, but showing the prop member in a folded position.

The prop member 40 is of H-shape, and includes two prop legs, each of which has an upper pivot end 41 with two lugs that are pivotally mounted on the respective lateral arm of the intermediate portion 21 about a pivot axis (a third pivot axis) parallel to the wheel axis, and a lower foot end 42 that is turnable about the pivot axis so as to move towards or away from the respective lateral arm of the intermediate portion 21 to thereby bring the base frame 20 to a laid-down position, as shown in FIG. 8, where the handgrip end 22 is close to the ground surface, or a standing position, as shown in FIG. 3, where the handgrip end 22 is remote from the ground surface.

Figure 4:
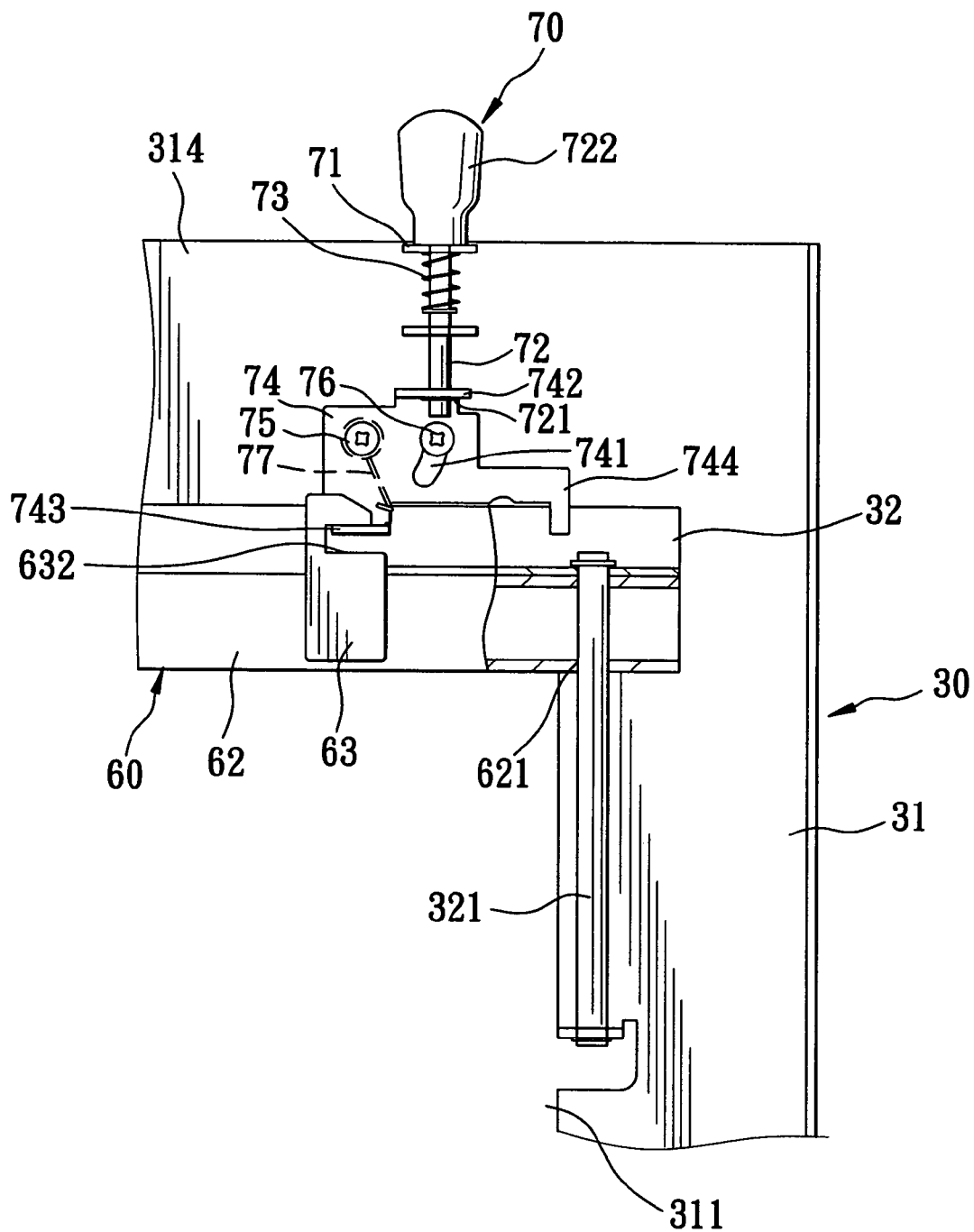
FIG. 4 is a fragmentary, partly sectioned schematic view of the preferred embodiment showing that a bracing member is locked by a rear locking unit.
Figure 11:
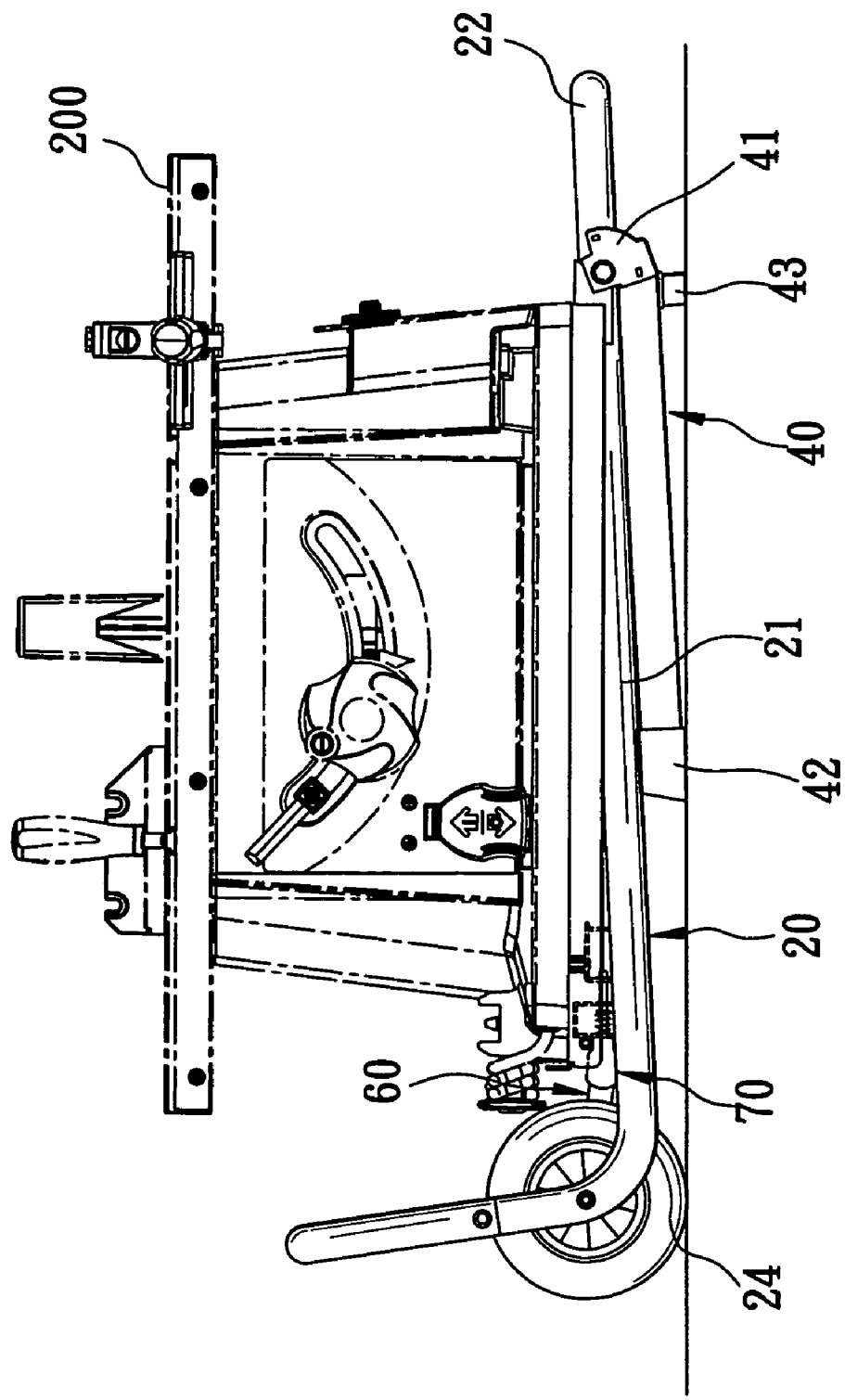
FIG. 11 is a view similar to FIG. 8, but showing the preferred embodiment in a folded state.

The tabletop unit 30 includes a tabletop 31 for supporting a machine 200 thereon, such as a table saw, and a guiding member 32 (see FIG. 4) disposed on an underside of the tabletop 31. The tabletop 31 is rectangular in shape, and has front and rear tabletop ends 310, 314 opposite to each other in the longitudinal direction. The front tabletop end 310 has two pivot regions 313 which are opposite to each other in the transverse direction and which are pivotally and respectively mounted on the lateral arms about a first pivot axis parallel to the wheel axis so as to enable the rear tabletop end 314 to turn about the first pivot axis from a working position, as shown in FIG. 3, where the rear tabletop end 314 is remote from the intermediate portion 21, to a folded position, as shown in FIG. 11, where the rear tabletop end 314 is close to the intermediate portion 21. Moreover, the tabletop 31 has an opening 311 is formed therethrough for collecting dust generated as a result of machining, and a plurality of elongated holes 312 for positioning the machine 200 at a desired position. A handle 315 is mounted on the rear tabletop end 314 and is to be held by the user when the tabletop 31 is turned from the working position to the folded position, thereby preventing accidental falling of the machine 200. With reference to FIG. 4, the guiding member 32 includes two parallel guiding shafts 321 that extend from the rear tabletop end 314 in the longitudinal direction.

Figure 5:
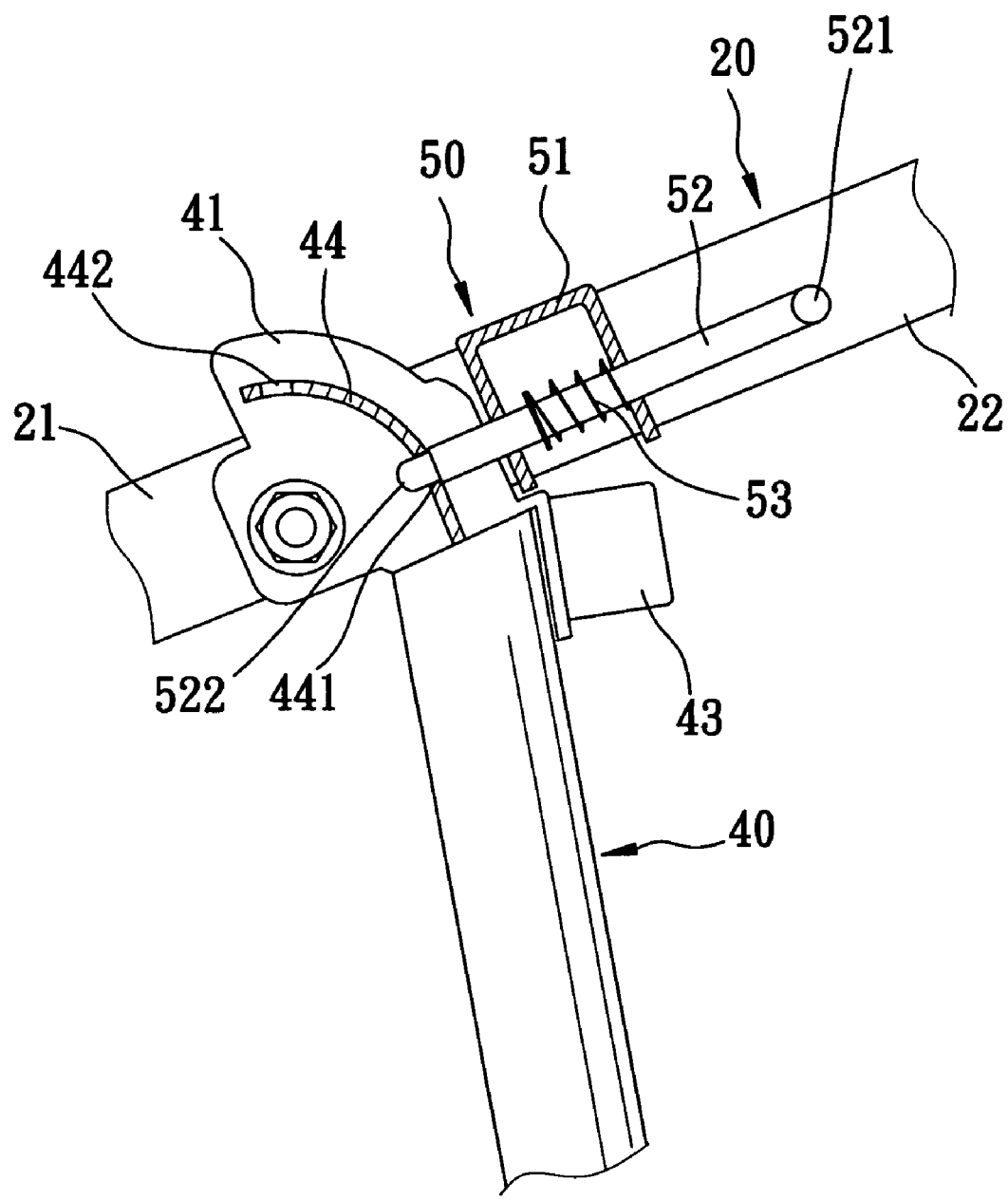
FIG. 5 is a fragmentary, partly sectioned schematic view of the preferred embodiment showing that a prop member is locked by a front locking unit.
Figure 6:
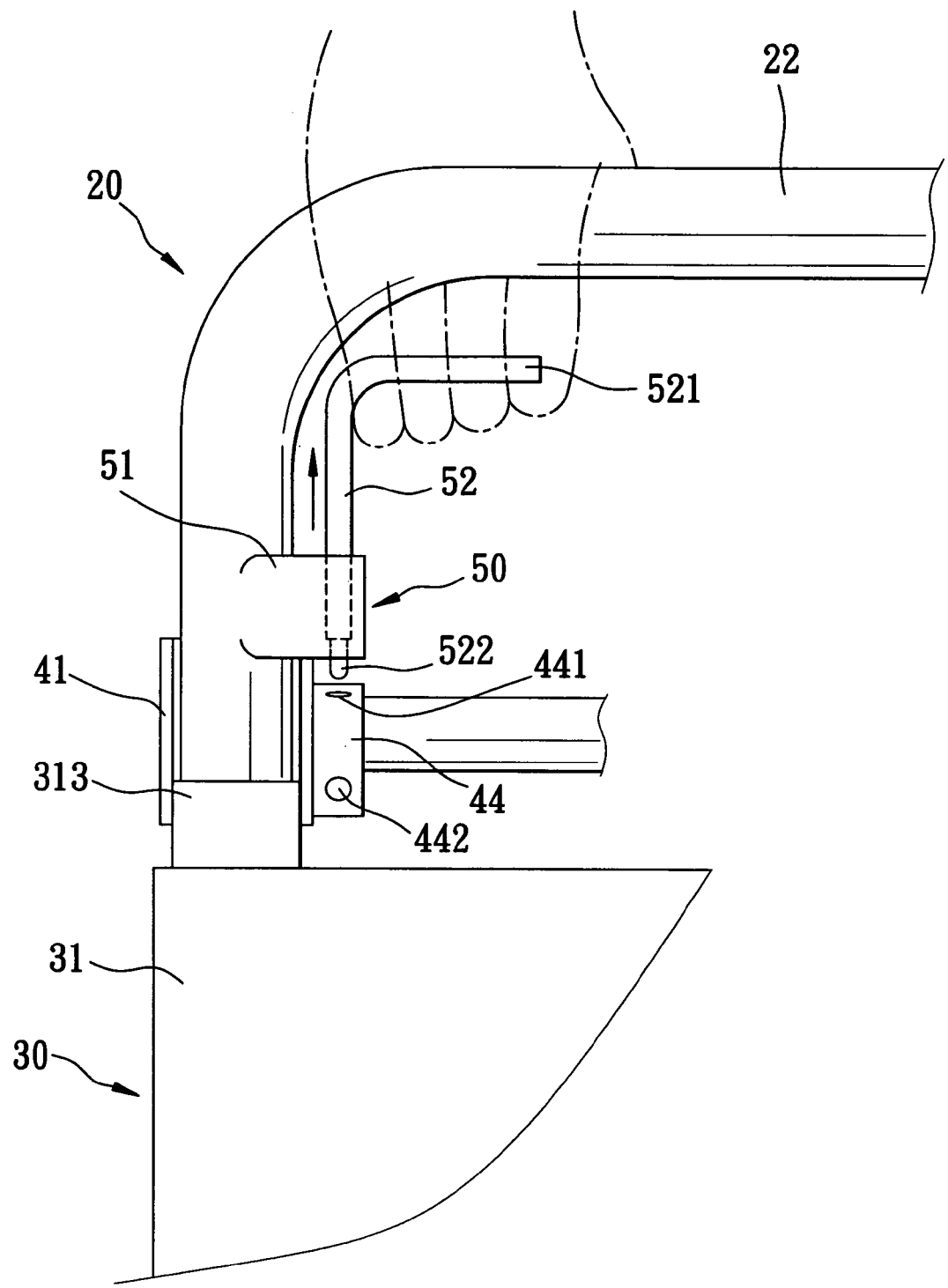
FIG. 6 is a fragmentary schematic view showing the front locking unit in an unlocking position.

Moreover, referring to FIGS. 2 and 5, one of the lugs of the upper pivot end 41 of one of the prop legs has an annular flange 44 which is formed with first and second positioning slots 441, 442 that are angularly displaced from each other about the third axis. The front locking unit 50 includes a seat 51 which is secured on the handgrip end 22 of the base frame 20, and an L-shaped retaining pin 52 which is movably disposed on the seat 51 and which is biased by a biasing member 53 that abuts against the seat 51 and the retaining pin 52 so as to bias the retaining pin 52 towards the annular flange 44. With reference to FIG. 6, the retaining pin 52 has an operating end 521 which extends towards the handgrip end 22, and an engaging end 522 which is movable between a first locking position, as shown in FIG. 5, where the engaging end 522 engages in the first positioning slot 441 to latch the base frame 20 in the standing position, and a second locking position, as shown in FIG. 7, where the engaging end 522 engages in the second positioning slot 442 to latch the base frame 20 in the laid-down position.

The bracing member 60 includes two bracing arms which are spaced apart from each other in the transverse direction. Each of the bracing arms has an anchoring end 61 which is pivotally mounted on the wheel-carrying end 25 about a second pivot axis (i.e. the wheel axis), and a slidable end 62 which is coupled with the rear tabletop end 314 such that when the rear tabletop end 314 is turned from the working position to the folded position, the slidable end 62 is turned about the second pivot axis to be closer to the intermediate portion 21. Specifically, referring to FIGS. 2, 4 and 10, the slidable end 62 of each of the bracing arms has a hole 621 for extension of the respective guiding shaft 321 therethrough such that the slidable end 62 can be guided to move along the guiding shaft 321 between the working position and the folded position. Moreover, first and second engaged portions 63, 64 are disposed on each of the bracing arms proximate to the slidable end 62 and the anchoring end 61, respectively. The first and second engaged portions 63, 64 have notches 632, 642, respectively.

Figure 10:
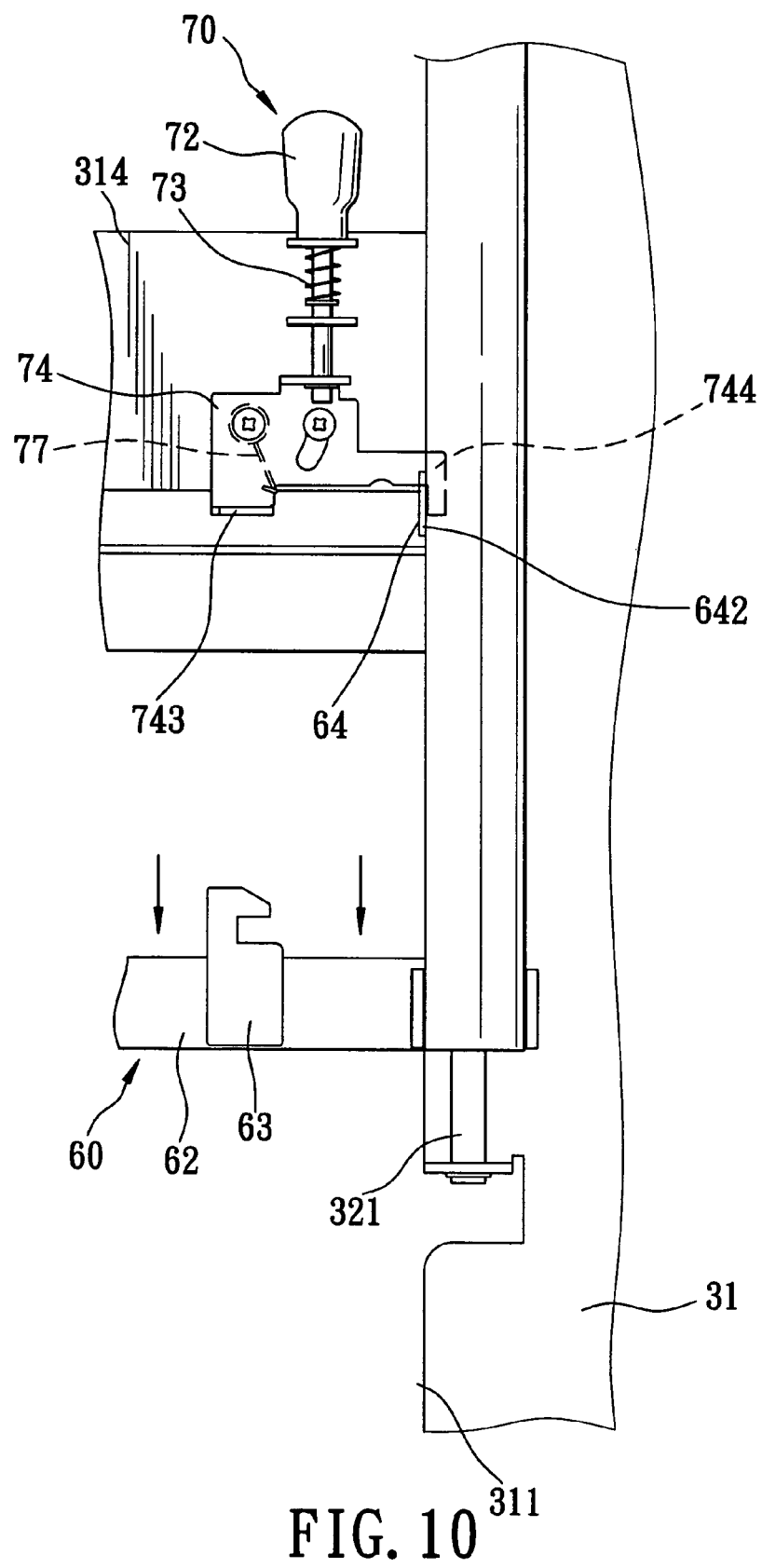
FIG. 10 is a view similar to FIG. 9, but showing the rear locking unit in another locking position.

With reference to FIG. 4, the rear locking unit 70 includes a seat 71 which is secured on the underside of the rear tabletop end 314 of the tabletop 31, and a retaining member 74 which has a pivoted area 75 pivotally mounted on the rear tabletop end 314, first and second engaging catches 743, 744 which are angularly displaced from each other about the pivoted area 75, and an arcuate keyway 741 which extends around the pivot area 75 such that a key 76 which is secured on the rear tabletop end 314 extends in the arcuate keyway 741 to guide turning of the retaining member 74 about the pivot area 75. Thus, the retaining member 74 is turnable between a first engaging position, as shown in FIG. 4, where the first engaging catch 743 engages the notch 632 in the first engaged portion 63 to arrest the rear tabletop end 314 in the working position, and a second engaging position, as shown in FIG. 10, where the second engaging catch 744 engages the notch 642 in the second engaged portion 64 to arrest the rear tabletop end 314 in the folded position. A biasing member 77, which is a torsion spring, is disposed to bias the retaining member 74 to one of the first and second engaging positions. An actuating member 72 is movably mounted on the seat 71, and has a connected end 721 connected to a connecting plate 742 of the retaining member 74, and an operated end 722 extending outwardly of the rear tabletop end 314 for manual operation. A biasing member 73 is disposed to abut against the seat 71 and the actuating member 72 so as to bias the actuating member 72 towards the slidable end 62 of the bracing arm.

Figure 7:
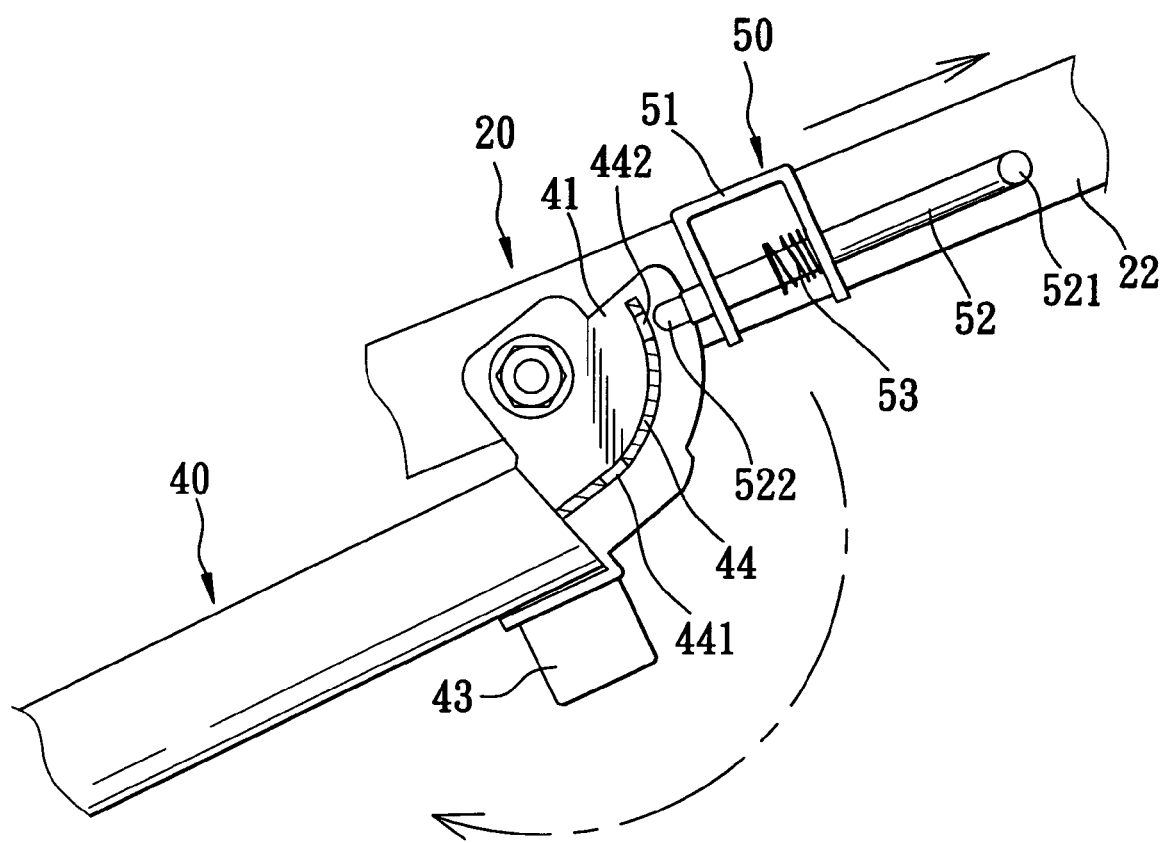
FIG. 7 is a view similar to FIG. 5, but showing the front locking unit in the unlocking position.
Figure 9:
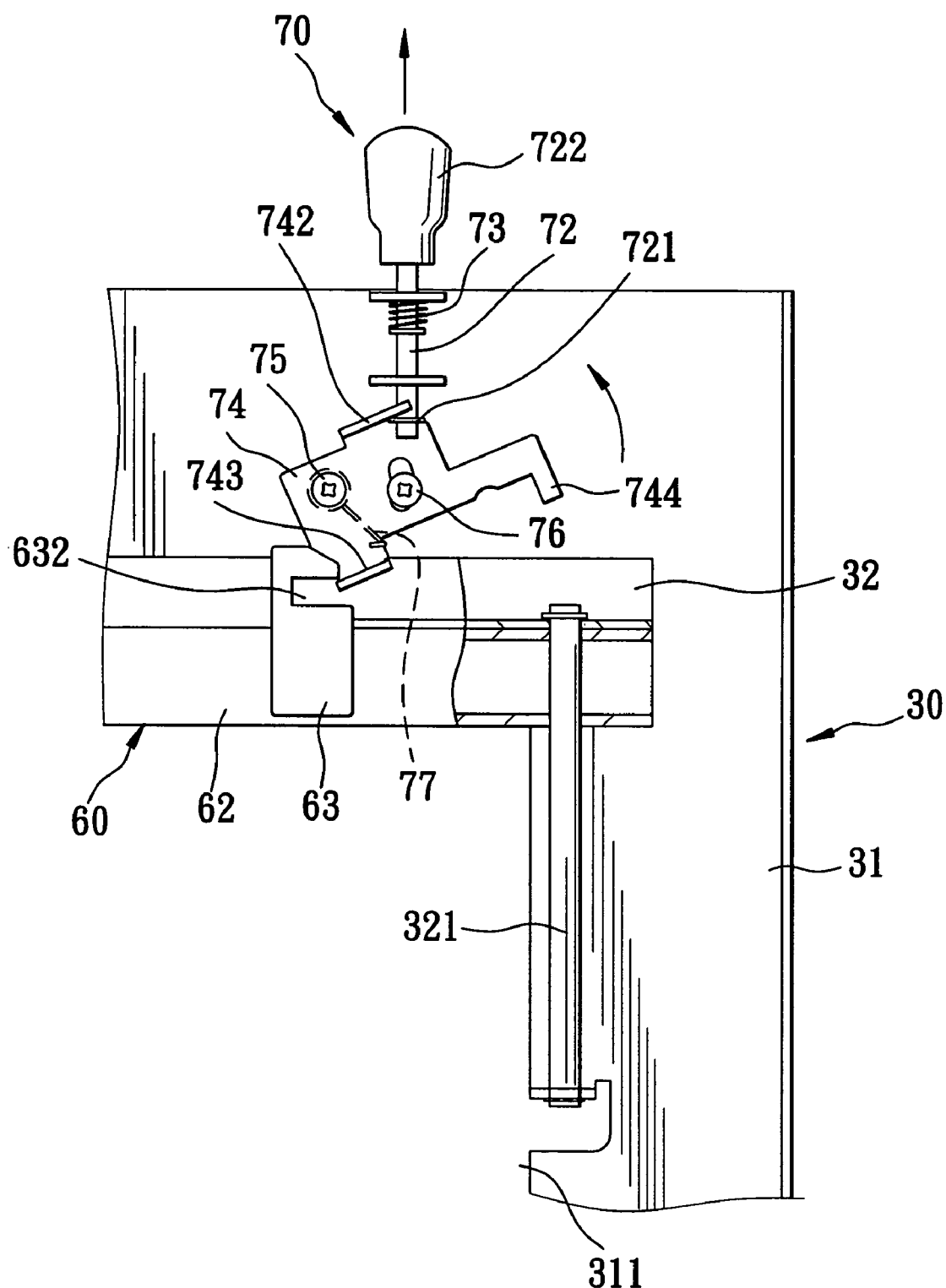
FIG. 9 is a view similar to FIG. 4, but showing the rear locking unit in an unlocking position.
Figure 12:
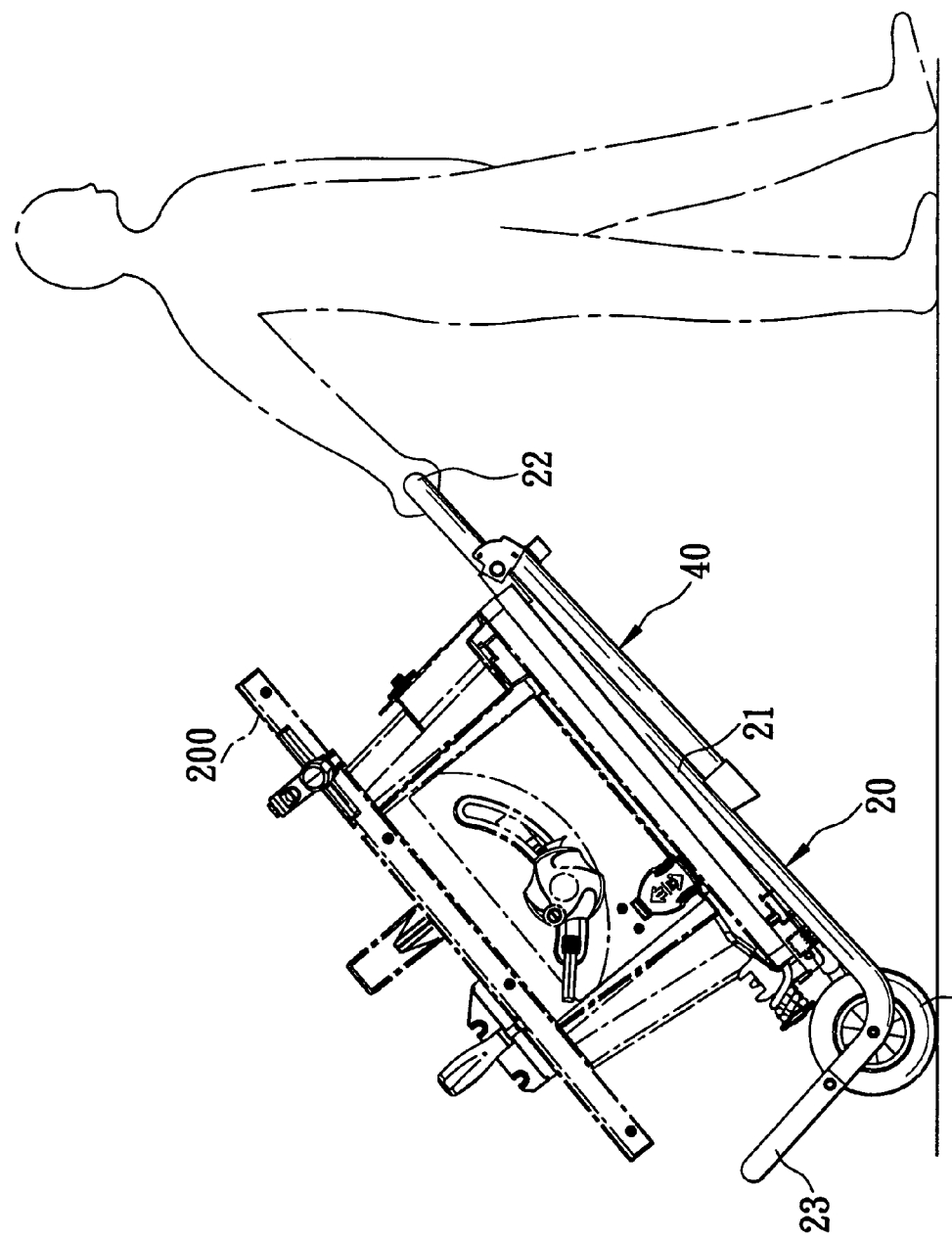
FIG. 12 is a schematic side view of the preferred embodiment when folded for moving by the user.
Figure 13:
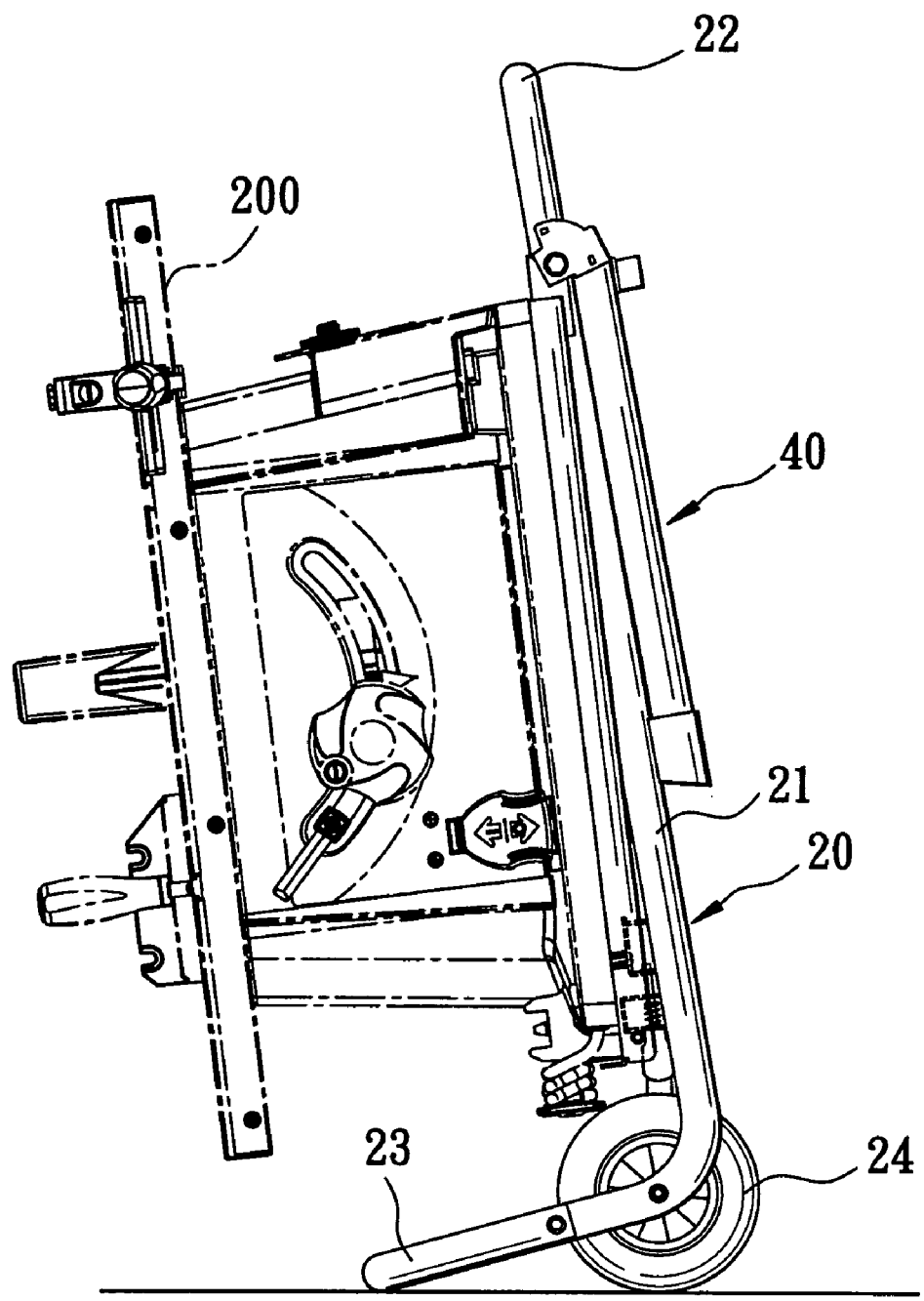
FIG. 13 is a schematic side view of the preferred embodiment in an upright folded state.

When it is desired to fold the frame assembly, as shown in FIGS. 5 to 7, the user first pulls the operating end 521 of the retaining pin 52 against the biasing action of the biasing member 53 so as to move the engaging end 522 away from the first positioning slot 441 and to permit turning of the prop member 40, thereby bringing the base frame 20 (see FIG. 8) to the laid-down position. In this position, two knee pads 43 which are disposed on the prop member 40 adjacent to the upper pivot ends 41 can rest on the ground surface. Subsequently, as shown in FIG. 9, the user grips the handle 315 (see FIG. 2) with one hand, and pulls the actuating member 72 with the other hand to turn the retaining member 74 against the biasing action of the biasing members 77, 73 so as to move the first engaging catch 743 away from the notch 632. As shown in FIG. 10, the slidable end 62 is then moved along the guiding shaft 321 and is turned about the second pivot axis to be closer to the intermediate portion 21 so as to bring the tabletop 31 to the folded position, as shown in FIG. 11. After the pulling force applied to the actuating member 72 is released, the retaining member 74 is turned to the second engaging position by the biasing actions of the biasing members 77, 73, thereby disposing the tabletop 31 at the folded position. Thus, as shown in FIG. 12, the user can lift the handgrip end 22 to transport the frame assembly, as well as the machine 200 carried thereon. Furthermore, as shown in FIG. 13, the user can also turn the base frame 20 about the wheel axis to an upright position, where the handgrip end 22 is farther away from the ground surface than when it is in the standing position. With reference to FIG. 2, a base prop 23 extends radially from the wheel-carrying end 25 relative to the wheel axis, and is angularly displaced from the handgrip end 22 about the wheel axis to rest on the ground surface so as to stabilize the base frame 20 in the upright position.

As illustrated, the front and rear locking units 50, 70 are operated separately to release the prop member 40 and the bracing member 60, respectively, so as to permit folding the frame assembly. Thus, folding and unfolding of the frame assembly can be conducted in a safe and convenient manner. Moreover, the tabletop 31 has a sufficiently large area for supporting machines 200 of different sizes thereon. Furthermore, the frame assembly is more compact after folding, thereby facilitating transportation and storage.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A foldable frame assembly for suspending a machine above a ground surface, comprising:
    a base frame having a wheel-carrying end and a handgrip end opposite to each other in a longitudinal direction, and an intermediate portion interposed between said wheel-carrying and handgrip ends;
    a prop member disposed to be connected to said intermediate portion so as to lift said base frame from a laid-down position, where said handgrip end is close to the ground surface, to a standing position, where said handgrip end is remote from the ground surface;
    a wheel unit which is rotatably mounted on said wheel-carrying end about a wheel axis transverse to the longitudinal direction, and which is disposed to rest on the ground surface in one of the laid-down and standing positions;
    a tabletop adapted to support the machine thereon, and having front and rear tabletop ends opposite to each other in the longitudinal direction, said front tabletop end being pivotally mounted on said intermediate portion so as to enable said rear tabletop end to turn about a first pivot axis from a working position, where said rear tabletop end is remote from said intermediate portion, to a folded position, where said rear tabletop end is close to said intermediate portion; and
    a bracing member having an anchoring end pivotally mounted on said wheel-carrying end about a second pivot axis which is parallel to the first pivot axis, and a slidable end coupled with said rear tabletop end such that when said rear tabletop end is turned from the working position to the folded position, said slidable end is turned about the second pivot axis to be closer to said intermediate portion; and
    a rear locking unit disposed to guard against movement of said slidable end relative to said rear tabletop end when said rear tabletop end is in the working position.

2. The foldable frame assembly of claim 1, wherein said base frame is disposed to be turned about the wheel axis to be lifted to an upright position, where said handgrip end is farther away from the ground surface than when said handgrip end is in the standing position, said foldable frame assembly further comprising a base prop which extends radially from said wheel-carrying end relative to the wheel axis and which is angularly displaced from said handgrip end about the wheel axis such that when said base frame is turned to the upright position, said base prop is brought to rest on the ground surface so as to stabilize said base frame in the upright position.

3. The foldable frame assembly of claim 1, further comprising a guiding member which is disposed on said tabletop adjacent to said rear tabletop end and which extends in the longitudinal direction to guide movement of said slidable end of said bracing member between the working and folded positions.

4. The foldable frame assembly of claim 3, wherein said rear locking unit includes
    first and second engaged portions disposed on said bracing member proximate to said slidable end and said anchoring end, respectively,
    a retaining member having a pivoted area pivotally mounted on said rear tabletop end, and first and second engaging catches angularly displaced from each other about said pivoted area, said retaining member being turnable about said pivoted area between a first engaging position, where said first engaging catch engages said first engaged portion to arrest said rear tabletop end in the working position, and a second engaging position, where said second engaging catch engages said second engaged portion to arrest said rear tabletop end in the folded position,
    a biasing member disposed to bias said retaining member to one of the first and second engaging positions, and
    an actuating member having a connected end connected to said retaining member, and an operated end extending outwardly of said rear tabletop end so as to be operated against biasing action of said biasing member to thereby move said retaining member away from one of the first and second engaging positions.

5. The foldable frame assembly of claim 1, wherein said prop member has an upper pivot end which is pivotally mounted on said intermediate portion of said base frame about a third pivot axis parallel to the first pivot axis, and a lower foot end which is turnable about the third pivot axis so as to move towards or away from said intermediate portion to thereby bring said base frame to one of the laid-down position and the standing position.

6. The foldable frame assembly of claim 5, further comprising a front locking unit that includes
    first and second positioning slots which are formed in said upper pivot end and which are angularly displaced from each other about the third pivot axis,
    a retaining pin which is disposed on and which is movable relative to said handgrip end of said base frame between a first locking position, where said retaining pin engages said first positioning slot to latch said base frame in the standing position, and a second locking position, where said retaining pin engages said second positioning slot to latch said base frame in the laid-down position, and
    a biasing member disposed to bias said retaining shaft to one of the first and second locking positions.

7. The foldable frame assembly of claim 6, further comprising a knee pad disposed on said prop member adjacent to said upper pivot end such that said knee pad rests on the ground surface when said base frame is in the laid-down position.

8. The foldable frame assembly of claim 1, wherein said intermediate portion of said base frame includes two lateral arms which are spaced apart from each other and which are disposed parallel to each other in a transverse direction relative to the longitudinal direction, said wheel-carrying end being a wheel axle which extends in the transverse direction to interconnect said lateral arms and which defines the wheel axis, said handgrip end being a handgrip shaft which extends in the transverse direction to interconnect said lateral arms, said front tabletop end of said tabletop having two pivot regions which are opposite to each other in the transverse direction and which are pivotally mounted on said lateral arms, respectively, said wheel unit including two wheels rotatably mounted on said wheel axle and disposed proximate to said lateral arms respectively, said prop member including two prop legs which are mounted respectively and pivotally on said lateral arms, said bracing member including two bracing arms which are spaced apart from each other in the transverse direction, and which are pivotally mounted on said wheel axle, respectively.

* * * * *